(12) United States Patent
Song

(10) Patent No.: US 6,870,465 B1
(45) Date of Patent: Mar. 22, 2005

(54) INTERFACE CONTROLLER FOR MAGNETIC FIELD BASED POWER TRANSMISSION LINE COMMUNICATION

(76) Inventor: Joseph Song, A-201 Jungwoo Vila, 110-14 Munjung-Dong, Songpa-Gu, Seoul (KR)

( * ) Notice: Subject to any disclaimer, the term of this patent is extended or adjusted under 35 U.S.C. 154(b) by 0 days.

(21) Appl. No.: 10/478,200
(22) PCT Filed: May 15, 2002
(86) PCT No.: PCT/KR02/00903
§ 371 (c)(1), (2), (4) Date: Nov. 19, 2003
(87) PCT Pub. No.: WO02/095979
PCT Pub. Date: Nov. 28, 2002

(30) Foreign Application Priority Data

May 19, 2001 (KR) .................................. 2001-0027448

(51) Int. Cl.[7] ........................................... H04M 11/04
(52) U.S. Cl. ........................ 340/310.06; 340/310.01; 333/1
(58) Field of Search ................ 340/310.01, 310.06, 340/310.03, 310.07; 333/1, 100; 375/240, 259, 257, 258; 455/402

(56) References Cited

U.S. PATENT DOCUMENTS

| | | | |
|---|---|---|---|
| 4,471,399 A | 9/1984 | Udren ........................ | 361/64 |
| 4,556,865 A | 12/1985 | Fukagawa et al. ...... | 340/310 R |
| 5,670,931 A | 9/1997 | Besser et al. .......... | 340/310.01 |
| 5,982,276 A | 11/1999 | Stewart .................... | 30/310.01 |
| 6,472,980 B1 * | 10/2002 | Jen et al. .................... | 340/506 |
| 6,492,897 B1 * | 12/2002 | Mowery, Jr. ........... | 340/310.01 |
| 6,674,806 B1 * | 1/2004 | Toda .......................... | 375/259 |
| 6,765,479 B2 * | 7/2004 | Stewart ................. | 340/310.01 |

FOREIGN PATENT DOCUMENTS

EP  0 267 595 A1  5/1988

OTHER PUBLICATIONS

PCT International Search Report; International application No. PCT/KR02/00903; International filing date: May 15, 2002; Mailing date: Jun. 28, 2000.

PCT Interantional Preliminary Examination Report; International application No. PCT/KR02/00903; International filing date: May 15, 2002; Completion date: Jul. 7, 2003.

* cited by examiner

Primary Examiner—Anh V. La
(74) Attorney, Agent, or Firm—Cantor Colburn LLP

(57) ABSTRACT

The present invention relates to magnetic field based power transmission line communication interface controller for subscriber's terminal to receive voice, data and other kinds of electrical signals converted from acoustic wave that is conveyed over the PAN communication network, or to transmit information from the subscriber's terminal to designated destination over the PAN communication network. The interface controller of the present invention is characterized by pumping acoustic wave into the microwave within the magnetic flux envelope generated along the magnetic field based power transmission line(PAN).

2 Claims, 4 Drawing Sheets

INTERFACE CONTROLLER FOR MAGNETIC FIELD BASED POWER TRANSMISSION LINE COMMUNICATION

TECHNICAL FIELD

The present invention relates to magnetic field based power transmission line communication interface controller for power transmission line communication using power transmission line as telecommunication media. To be more in detail, the magnetic field area produced along the power transmission line is used as transmission media out of power transmission line communication technology.

BACKGROUND ART

Distinct from data communication media using the telephone line or coaxial cable, power transmission line communication takes advantage of using pre-installed power transmission line network and do not require additional installations for the new communication network.

There are two kinds of communication technology proposed today using the power transmission line communication as stated above, the Power Line Communication (PLC) and Powerline Area Network (PAN).

PLC technology transmits information for data, voice and image over the power transmission line (electricity cable) for transmission media, which is utilized since 1920 for short distance LAN data transmission. Because of 1 MHz–30 MHz band frequency development for wide area network nowadays, the technology have been grown and used for wide area network services for internet subscribers.

The said PLC technology is a transmission method using the carrier waves in distinct power transmission line frequencies for transmitting modulated signal for the receiver to selectively receive and demodulate the signals.

On the other hand, instead of using the power transmission line itself as transmission media, the said PAN technology is a method for voice and data transmission utilizing the magnetic field as a waveguide, which is generated along the power transmission line when electricity power is provided over the power transmission line.

Therefore, as illustrated in FIG. 1, the magnetic flux envelope (100) is used for the transmission media, which is generated around the power transmission line while electricity power is provided. The microwave is pumped into the specific 30 GHz–2,400 GHz sympathetic electric frequency band in said magnetic flux envelope. All subscribers and servers utilizing said microwave to transmit voice and data information converted to acoustic wave are conveyed in piles over said microwave to accomplish the communication.

The microwave pumped into said envelope (100) according to FIG. 1 is produced by a MASER (3) through synthetic aperture lens (SAL: 4) generating amplified microwave pulse.

When said magnetic field based power transmission line network is activated by the traffic, the telephonic voice and data information transmitted by terminals (400) from diverse areas according to FIG. 2 are carried in a coherent acoustic type signal form by said microwave within the magnetic flux envelope (100).

According to FIG. 2, inductive coupler (1) is used to receive transmitted information to detect and convert the electromagnetic field into electrical signals, which the signal is analyzed by the signal processor after verification and distributed to the designated subscriber or subscribers in accordance with the information protocol. The Q-Switch (5) controls the transmission for said information.

DISCLOSURE OF THE INVENTION

The proposal of the present invention is to provide magnetic field based power transmission line communication interface controller for subscriber's terminal to receive voice, data and other kinds of electrical signals converted from acoustic wave that is conveyed over the PAN communication network, or to transmit information from the subscriber's terminal to designated destination over the PAN communication network.

To achieve the above proposal, the interface controller of the present invention is characterized by pumping acoustic wave into the microwave within the magnetic flux envelope generated along the magnetic field based power transmission line(PAN).

Therefore, the interface controller of the present invention further comprises: an antenna to reflect microwave resonating in the high frequency band ranging from 30 GHZ to 24,000 GHZ; a transmitter/receiver connected to said antenna, to receive or radiate the acoustic wave at said antenna carried within said microwave; a piezoelectricity converter connected to said transmitter/receiver to receive said acoustic wave, and for generating electric signal from the acoustic wave vibration; an input/output controller to receive said electric signal, controlling input/output process of the terminal device interconnected to a connector to process synchronous signal information, and to carry additional signal property data into the signal transmitted at said terminal device.

Therefore, the interface controller of the present invention further comprises a procedure to process synchronous communication signal by a clock and memory containing the address information in said input/output controller.

Therefore, the interface controller of the present invention further comprises a piezoelectric device within the piezoelectricity converter having at least $10^{-12}$ volt of nuclear piezoelectric film sensing property.

BEST MODE FOR CARRYING OUT THE INVENTION

Figure 1:
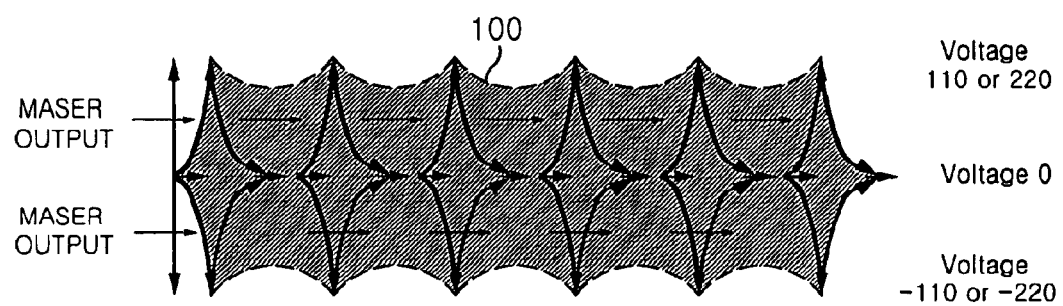
FIG. 1—Graph illustrating AC voltage cycle of the magnetism frame.
Figure 2:
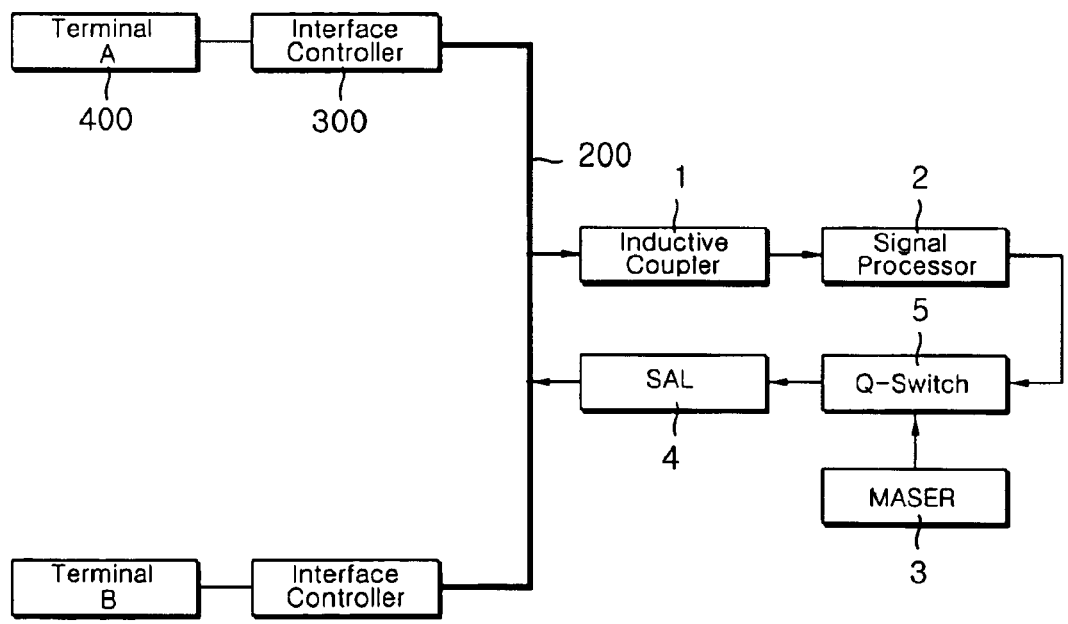
FIG. 2—Outline drawing illustrating conventional magnetic field based power transmission line communication network.
Figure 3:
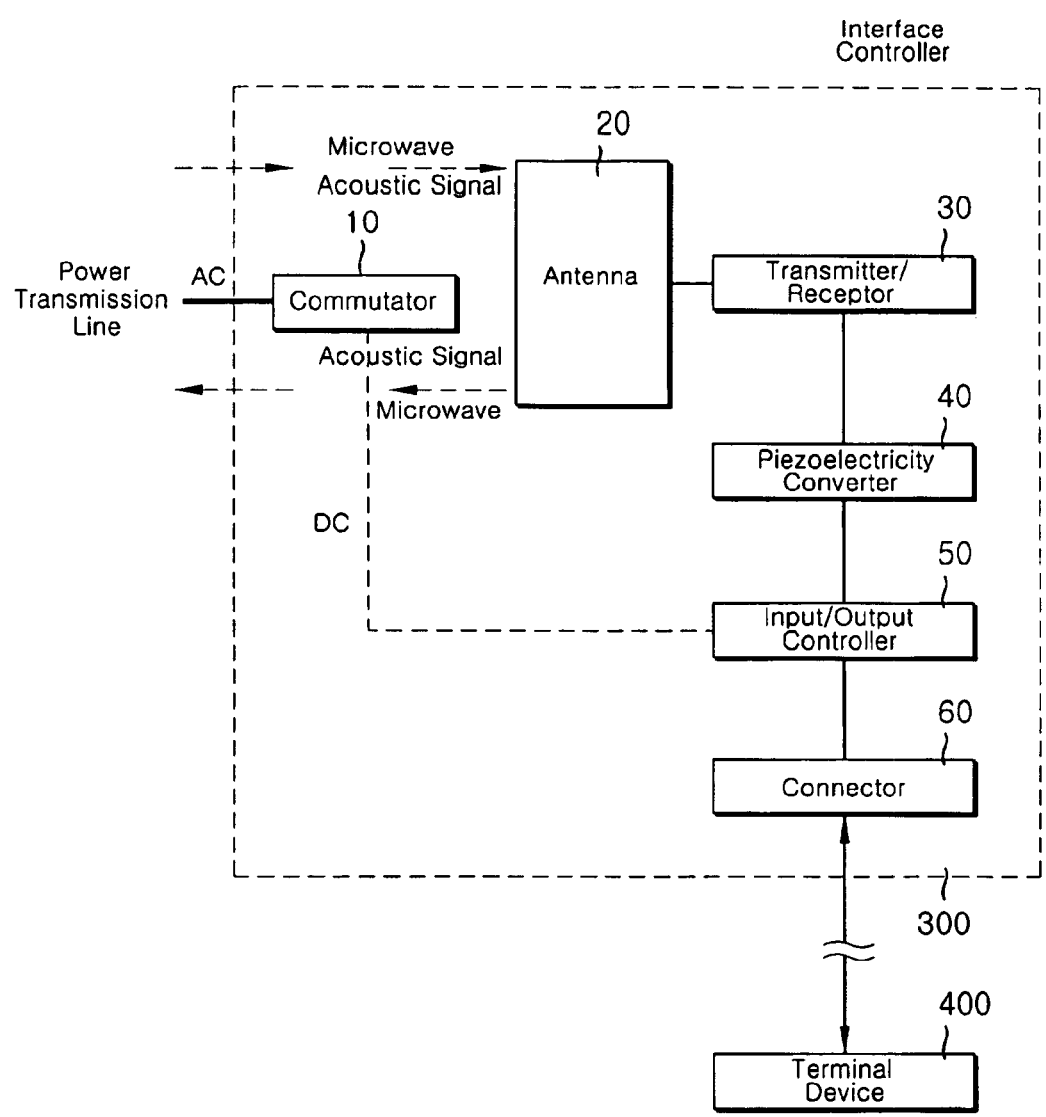
FIG. 3—Diagram illustrating interface controller of the present invention.
Figure 4:
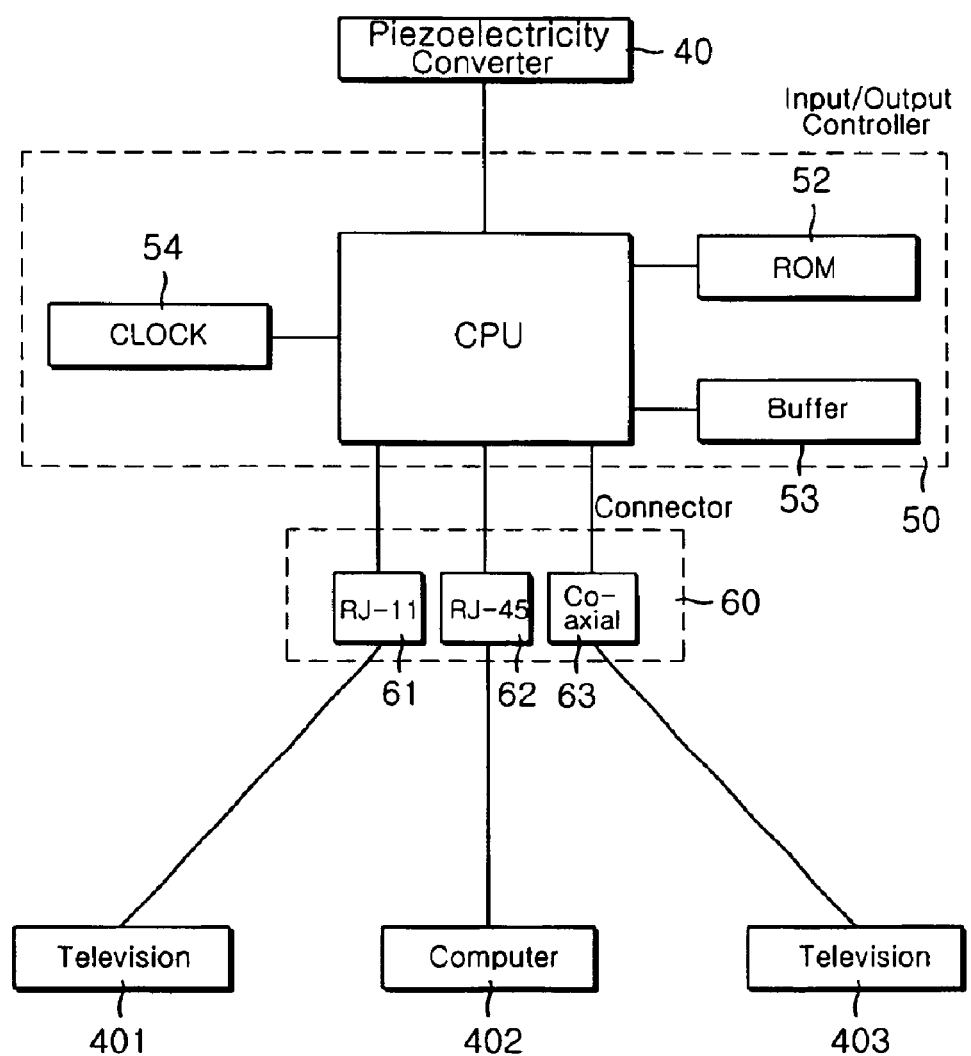
FIG. 4—Detailed diagram illustration out of FIG. 3.

The present invention will be more clearly understood from the following detailed illustration of FIG. 3 and FIG. 4.

FIG. 3 is a drawing illustrating the connection outline of the interface controller of the present invention between the terminal device and the power transmission line.

According to FIG. 3, the transmitted/received data in PAN communication network in a form of acoustic signal in the microwave within the magnetic flux envelope (100) is transmitted to the interface controller (300). The commutator (10) converts the AC electrical current to DC, to be transmitted to the interface controller by said wave above to be used as interface controller's electricity power.

The said interface controller (300) transmits the appropriate signals (voice, image, data) detected in the acoustic wave from the magnetic field based power transmission line to the corresponding terminal devices. Therefore, when a user sends information to a designated destination, all kinds of user's information signal is converted to acoustic wave to be transmitted by the microwave within the magnetic field generated along the power transmission line.

The interface controller described above comprises: an antenna (20) to receive acoustic wave within the microwave transmitted over the power transmission line, and to reflect the microwave; a transmitter/receiver (30) connected to said antenna, to receive or radiate with said antenna the acoustic wave carried within said microwave; a piezoelectricity converter (40) connected to said transmitter/receiver to detect the vibration from said acoustic wave, therefore to convert from mechanical energy to electrical energy or from electrical energy to mechanical energy; an input/output controller (50) to control input/output process of the converted electrical signal from the terminal device (400); a connector (60) interconnected to the terminal device (400).

The said interface controller's antenna (20) is to enable bi-directional communication of the microwave generated along the power transmission line. The microwave transmitted along the power transmission line from the antenna to the interface controller receives a reflex action, and the acoustic signal outputted from the interface controller is pumped into the reflected microwave for transmission.

To handle acoustic wave received by piezoelectricity converter (40) at said terminal device (400), the piezoelectric device is used to generate piezoelectricity produced by external mechanical vibration force.

Materials for piezoelectric device can be made with crystalline, tourmaline, and ceramic, etc., and a piezoelectric semiconductor having semiconductor and piezoelectric property, further more the nuclear materials such as PTDF, PVF and nuclear piezoelectric film are used. It is desirable to utilize super conducting nuclear piezoelectric film with voltage property of at least $10^{-12}$ volt.

The positive and negative signals produced by the piezoelectric device is converted and then constantly carried by pulse circuits to the input/output controller (50).

Therefore, the predetermined constant wave oscillation measurement number is used for PAN communication addressing.

The input/output controller (50) within the interface controller of the present invention according to FIG. 4 comprises a CPU (51) for controlling the system, a clock (54) used at interrupter source for synchronous communication, a ROM (52) stored with software and address information, and buffer (53) to store temporary transmission/reception data.

Therefore, the said buffer comprises a passive GPS (Global Positioning System) buffer to discover subscriber's location and a passive TDR(Time Domain Reflectometry) buffer.

The said CPU (51) controls the input/output module through the software stored in the ROM (52), executes the communication protocol, to process the data packet or to carry and divide extra signal data.

The said connector (60) comprises: a RJ-11 Jack (61) and coaxial cable to connect the telephone or video image equipments; a jack to operate USB port and internet equipment like internet RJ-45 jack (62). Each jack is connected to the CPU (51) within the input/output controller (50).

According to FIG. 4, the appropriate terminal devices (401, 402, 403) are connected to said connector (60), therefore the said CPU (51) within the input/output controller (50) adds additional signal property data after distinguishing the signal data transmitted at the terminal device through the connector when judged as telephonic voice signal data or TV image signal data.

Although not illustrated in the figure, the present invention further comprises a LED lamp to indicate communication status between the PAN communication network and the interface controller.

The interface controller's transmission/reception operation of the present invention is explained from the following description.

At user's terminal device, by input/output controller's (50) control the extra telephonic signal property information is added to the signal provided by the RJ-45 Jack (62) within the computer (402), and then the signal data is converted to acoustic signal by the piezoelectric converter, and then outputted at the transmitter/receptor (30) to be conveyed by microwave to the destination.

Meanwhile, the signal received from the power transmission line is detected by the antenna (20), and is transmitted from the transmitter/receptor (30) to the piezoelectricity converter (40). The piezoelectricity converter converts said acoustic signal to electric signal to be selectively divided and decoded by the input/output controller (50), so the received signal can be distributed to appropriate connectors by sending image signal to the coaxial cable (63), telephonic voice signal to the RJ-11 jack (61), and data signal to the RJ-45 jack (65). The said transmitted signal is outputted by appropriate terminal devices (401, 402, 403) interconnected to the connector.

INDUSTRIAL APPLICABILITY

As described above, the present invention relates to magnetic based power transmission line interface controller to convert acoustic wave transmitted over PAN communication network into electrical signal, thus to receive voice, data and all kinds of information at the user's terminal device, or to retransmit the information from user's terminal device to the destination.

What is claimed is:

1. A magnetic field based power transmission line interface controller for power transmission line communication transmitting acoustic wave within the microwave of the magnetic field envelope formed along the power transmission line comprises:

an antenna to reflect microwave resonating in the high frequency band ranging from 30 GHZ to 24,000 GHZ;

a transmitter/receiver connected to said antenna, to receive or radiate with said antenna the acoustic wave carried within said microwave;

a piezoelectricity converter connected to said transmitter/receiver to receive said acoustic wave, and for generating electric signal from the acoustic wave vibration;

an input/output controller to receive said electric signal, controlling input/output process of the terminal device interconnected to a connector and to process synchronous signal and native address information in the memory through clocking, and to carry additional signal property data into the signal transmitted by said terminal device.

2. A magnetic field based power transmission line interface controller in accordance with claim 1, further comprises a piezoelectric device within the piezoelectricity converter having at least $10^{-12}$ volt of nuclear piezoelectric film sensing property.

* * * * *